United States Patent [19]

Ota et al.

[11] 3,726,041
[45] Apr. 10, 1973

[54] APPARATUS FOR FILLING AND PACKING SOIL

[75] Inventors: Akira Ota; Nobutaka Nakamura, both of Sapporo; Ryuzo Tsuru, Hokkaido, all of Japan

[73] Assignee: Nippon Tensai Seito Kabushiki Kaisha, Tokyo, Japan

[22] Filed: Dec. 27, 1971

[21] Appl. No.: 212,221

[30] Foreign Application Priority Data

Dec. 30, 1970 Japan..............................45/139901

[52] U.S. Cl...................................................47/1
[51] Int. Cl...............................................A01g 9/08
[58] Field of Search......................................47/1, 37

[56] References Cited
UNITED STATES PATENTS 2,444,744  7/1948  Mossholder..............................47/37
2,771,709  11/1956  Ritter..............................47/1
2,826,003  3/1958  Oki et al...........................47/1
3,571,971  3/1971  Broersma..........................47/1
3,659,380  5/1972  Mayer.............................47/1

Primary Examiner—Robert E. Bagwill
Attorney—Joseph F. Brisebois et al.

[57] ABSTRACT

The present invention relates to an apparatus for filling and packing soil in containers adapted to temporarily receive seeds or plant seedlings. The apparatus includes means for compressing the soil in the containers by pressing the lower lap of a conveyor belt downwardly thereon and means for packing the soil in the containers and forming an opening therein.

6 Claims, 4 Drawing Figures

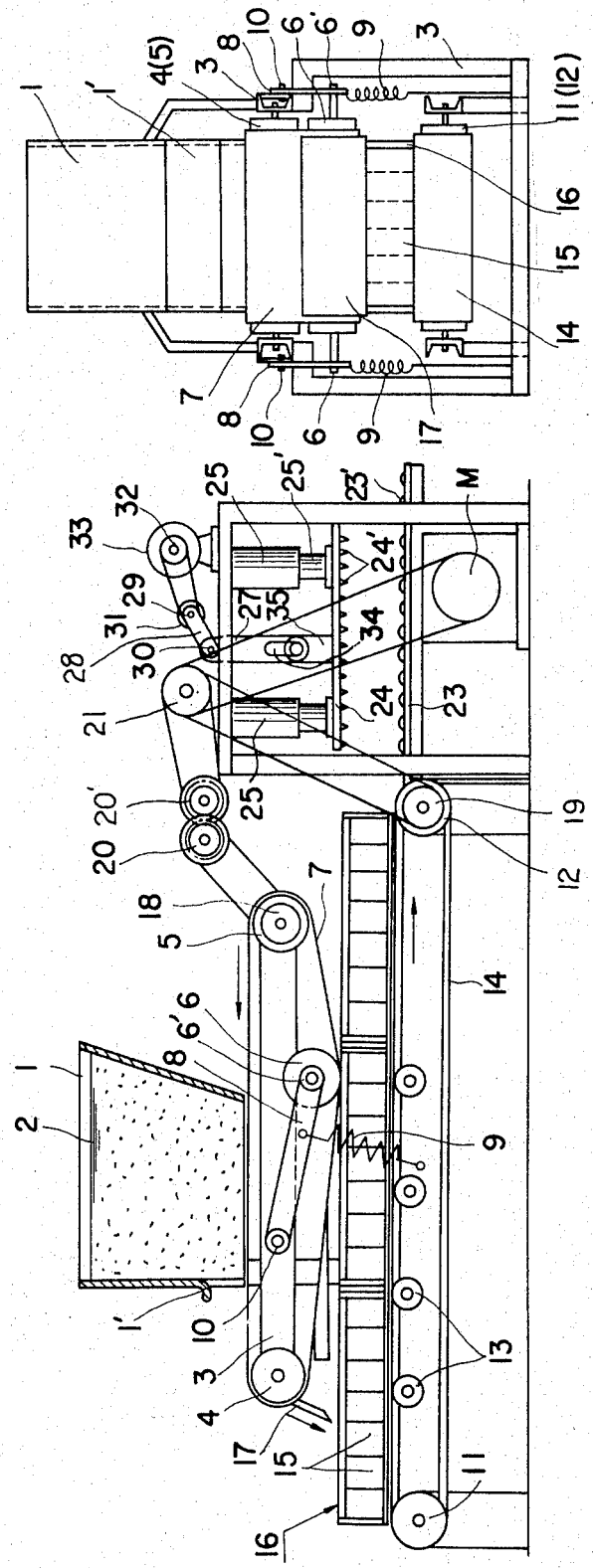

APPARATUS FOR FILLING AND PACKING SOIL

SUMMARY OF THE INVENTION

The present invention relates to an apparatus for filling containers with soil so that seedlings may be raised therein, and in particular to an apparatus for filling and packing a predetermined volume of soil in the containers to a fixed density and for producing an opening in the soil adapted to temporarily receive seeds or plant seedlings.

It has been common to utilize containers of decomposable material such as paper, peat, etc., in which seedlings are raised, and to transplant them into the open fields. These containers are filled with the soil prior to the sowing of seeds or the planting of seedlings therein. This filling is usually performed manually or using a filling machine of the type shown in Japanese Patent Publication No. Sho 45-8125. When using this prior machine the soil is piled over the containers and then repeated shocks or vibrations are applied to the containers until the bed soil settles down therein. This machine has the problem of causing objectionable noise and clouds of dust during its operation, which results in reduced operating efficiency and poor sanitation. And what is worse, the filling density of the bed soil depends on the operator's sense of touch. Therefore, it may often occur that the soil tends to sink when watered, due to its inadequate density or, on the contrary, the growth of the roots is obstructed when the soil is too dense. In any case, uniformly grown seedlings are not obtained.

It is, therefore, a general object of the present invention to provide an apparatus which obviates the disadvantages of the type described above by filling and packing rows of containers with a selected predetermined volume of soil to a selected density, thereby enabling seedlings raised in these containers to grow uniformly and to be easily transplanted to the ground from the containers.

It is a primary object of the invention to provide an apparatus for filling rows of containers of a bottomed or bottomless type which are carried on a cradle.

It is another object of the invention to provide an apparatus for filling and packing each container with a selected volume of soil to a selected density, and further producing an opening therein adapted to receive seeds or plant seedlings temporarily.

It is yet another object of the invention to provide an apparatus for producing an opening in the soil after having filled each container with soil which has previously been sorted out by means of a sieve, having pressed down the soil by utilizing travelling conveyor means during the advance of each container, and having compressed the soil to a density adapted to a planting bed.

It is a further object of the invention to provide an apparatus which includes two discrete conveyor means at the upper and lower portions of the apparatus, the lower means being intended for conveying rows of containers and the upper means for transferring the soil to each container while it is carried by the lower means. In the apparatus according to the invention, the soil thrown in each container on the lower conveyor is compressed to a certain degree with its surface being flattened, by utilizing a part of an endless belt which is pressed down during its passage beneath the upper conveyor.

It is a still further object of the invention to provide an apparatus wherein the aforesaid device for compressing the soil and flattening the surface thereof serves itself as a device for tensioning the upper conveyor belt, and this device, as counter-supported by the conveyor belt, is capable of keeping the compression given to the soil under control and feeding rows of containers in a proper manner.

It is yet a further object of the invention to provide an apparatus wherein a plurality of the containers disposed on the cradle are successively conveyed by conveyor means, each container receiving a volume of the soil during travel of the cradle carrying rows of the container. The soil thus enclosed in the container is then compressed to a certain extent and its surface is flattened. The next step is carried out by a packing device which moves up and down repeatedly and intermittently and comprises a plurality of projections which dig an opening in the soil enclosed in each container to receive seeds or plant seedlings temporarily.

Other objects of the invention will be apparent from the folling description of a preferred embodiment of the invention illustrated in the accompanying drawings, in which:

FIG. 1 is a side elevational view of an apparatus according to the invention;

FIG. 2 is a front elevational view taken from the left of FIG. 1;

Figure 3:
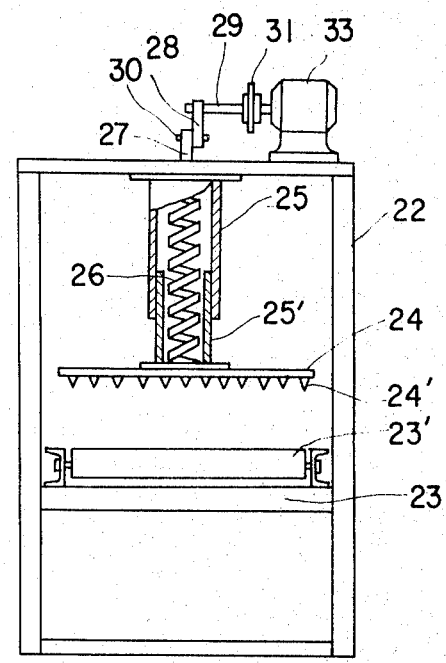
FIG. 3 is a side view on an enlarged scale, showing a packing device for packing the soil and producing an opening therein, which is used in the apparatus according to the invention.

In FIGS. 1 and 2, reference numeral 1 indicates a bottomless hopper provided with a gate 1' at the bottom thereof which is vertically adjustable to regulate the amount of soil discharged therethrough. The soil 2 within the hopper has been sorted by means of a sieve to have a proper grain size, and may be mixed with necessary ingredients, such as fertilizer. A machine frame, 3, supports two horizontally spaced rollers 4 and 5, and carries the hopper 1. An upper conveyor belt 7 is horizontally stretched between the rollers 4 and 5. Reference numeral 8 indicates an arm and 9 a spring. One end of the arm 8 is loosely attached to the frame 3 by a pin 10, and the other end by the axle 6' of a tension roller 6. The spring 9, stretched between the arm 8 and the frame 3, draws the roller 6 downwardly at all times. Due to the action of the spring 9 and the roller 6 resulting from the arrangement described above, the upper conveyor belt 7 serves as a pressure belt for the soil, since the belt is held under tension and pressed down during the lower part of its path of travel.

Two rollers indicated at 11 and 12, and a revolving wheel 13 are respectively supported by the frame 3. Another horizontal conveyor belt 14 is stretched therebetween beneath and parallel to the upper conveyor belt 7.

A plurality of containers 15 within which seeds will be sown or seedlings will be raised are arranged in rows upon a cradle 16. A scraper 17 secured to the frame 3 is in contact with the upper conveyor belt 7 at one end thereof, with its other end at a required distance above the container 15 so that it may scrape away the surface of the soil 2 discharged from the gate 1' in order to distribute the soil uniformly to each container. Belt pulleys 18 and 19 are coaxially supported by the rollers 5 and 12 respectively. A pulley 21, which is actuated by a power source M, drives both the belt pulleys 18 and 19. Through interlocking of the gears 20 and 20', the pulley 21 causes both the upper conveyor belt 7 and the lower conveyor belt 14 to travel at the same speed and in the same direction where these two belts face one another.

Figure 4:
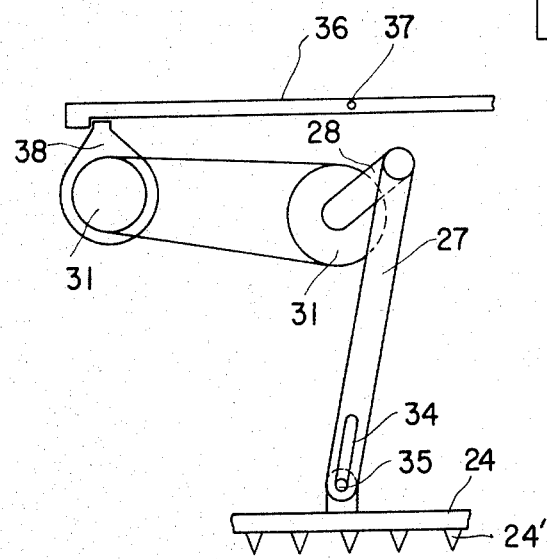
FIG. 4 is a schematic side view on an enlarged scale, showing another packing device according to the invention.

In FIG. 3 where a preferred packing device is illustrated, reference numeral 22 indicates the machine frame. An underframe 23 supports a roller conveyor 23' which receives the cradle 16 which is delivered thereto by and from the upper and lower conveyor belts 7 and 14. In this arrangement, the roller conveyor 23' may be driven by a separate power source in order to regulate the speed of travel of the cradle 16. A packing plate 24, has a horizontal surface a little smaller than that of the cradle 16. Reference numeral 24' indicates the projections for digging openings in the soil enclosed in the containers. A plurality of projections 24' are provided facing each row of containers 15. The cradle 16 may be passed through the frame 22 and located under the packing plate 24 by utilizing the force of the upper and lower conveyor belts or may be conveyed to that location by suitable conveying means. In any case, after it is determined by eye or by suitable detecting means that the cradle is located right under the packing plate 24, the packing plate is dropped rapidly in order to press down the soil 2 enclosed within the containers 15 and to simultaneously create an opening therein. A detector to be used in this arrangement may be a simple mechanism wherein a projection formed at an optional point on the frame 22 comes into contact with the cradle 16, or may be some type of ordinary electrical or mechanical detector. Furthermore, the overall operations involved in this packing device will be facilitated by adopting a method wherein the cradle 16 is passed along a fixed path into the frame 22. One of the supporting cylinders 25 is an outer cylinder which is secured to the frame 22, and the other cylinder 25' is an inner cylinder which is secured to the packing plate 24. Within these cylinders there is housed a spring 26 which always biasses the packing plate 24 downwardly. FIGS. 1 and 3 also show various members forming the device, namely, a rod 27, a crank arm 28, a crank shaft 29, a pin 30, a pulley 31, a slot 34 in the arm 27, and a pin 35 secured to the packing plate 24 and engaged in the slot 34. The crankshaft 29 is fixed to the crank arm 28, which is loosely attached to the rod 27 by the pin 30 and causes the packing plate 24 to move up and down through the slot 34 and the pin 35. This vertical movement of the plate 24 should correspond to rotations of the upper and lower conveyor belts 7 and 14, which may be performed by hand or more conveniently by using a common commercially available type of clutch to interlock with the aforesaid detecting means. In order to explain more particularly, an example is given in FIG. 4. A pin 37 secured to the machine frame 3 (FIG. 2) is loosely fitted into the center of a rod 36. One end of the rod 36 engages a one-revolution clutch 38 while its other end is connected to the aforesaid detecting device through a solenoid. Reference numeral 32 indicates a pulley, and 33 indicates a motor which supplies the required power to a pulley 31 through suitable drive means.

In operation, the cradle 16, loaded with rows of empty containers 15, is placed on the lower conveyor belt 14. The power source is actuated to rotate the pulley 21. The upper and lower conveyor belts 7 and 14 now rotate in the direction indicated by the arrow. At this moment, as the upper conveyor belt 7 travels round, the bed 2 begins to be discharged from within the hopper 1 with its volume regulated by the gate 1'. The soil then falls along the surface of the scraper 17 at the input end of the upper conveyor belt 7 and enters the container 15. Then, the scraper 17 scrapes away any excess of the soil piled in the container so that the upper surface of the soil is kept at the same level. As the cradle 16 advances further, it is inserted between the upper and lower conveyor belts 7 and 14. When the cradle passes through this narrow gap, the soil 2 is roughly compressed so that its upper surface may reach the level of the top rim of the cradle. The cradle is taken away from the end of the lower conveyor belt 14.

Rows of containers filled with the soil 2 under uniform pressure are conveyed to the conveyor roller 23' above the underframe 23, along with the cradle 16. At this time the one-revolution clutch 38 is idling with reference to the crankshaft 29, and the crank arm 28 is held by the one-revolution clutch at its top dead center. When the cradle 16, moving forward on the conveyor roller 23', reaches a position directly beneath the packing plate 24, the one-revolution clutch 38 then becomes operative, and through operation of the crank arm 28 and the rod 27 the packing plate 24 is dropped rapidly by force of the spring 26, which has previously remained compressed. Thus, in proportion to the force of the spring 26, the soil enclosed within each container 15 is compressed and an opening is created therein. In this case, the pressure applied to the packing plate is supplied by the spring 26 and not by the crank arm 28, by reason of the slot 35 in the rod 27. The one-revolution clutch 38 may be operated manually or by means of an interlocking mechanism in which the probe of a detecting device is provided at a suitable point on the frame 22 and a solenoid or the like functions when the cradle 16 arrives at a designated point. Subsequent to the dropping of the packing plate 24, the revolution of the one-revolution clutch 38 causes the crank arm 28 to rotate and the packing plate is lifted by the rod 27. When the crank arm 28 reaches its upper dead point, the one-revolution clutch 38 comes to a standstill. A cycle for the packing device is now completed. The cradle 16 is removed from the device by suitable means such as quick feed mechanism. The containers 15 are ready for sowing seeds or planting seedlings temporarily therein.

As hitherto described, the apparatus according to the invention carries out the first step of compressing the soil 2 by means of the upper and lower conveyor belts 7 and 14 to obtain a roughly uniform density of the soil, and the second step of packing the bed 2 by utilizing the constant pressure of the spring 26. Thus, the soil within the containers 15 has an almost uniform density for each container. Seedlings reared in these containers will grow all alike. These seedlings are easily transplanted to the ground manually or mechanically.

It will be understood that the invention is not limited to the above embodiment and that various changes and modifications as to details may be made within the scope of the invention.

What is claimed is:

1. Apparatus for filling containers with soil and packing the soil therein, which apparatus comprises:

lower conveyor means to convey said containers from an input end to an output end, continuous upper conveyor means positioned above said lower conveyor means and having upper and lower laps, means above said upper conveyor means for supplying soil to said upper lap, said upper lap being positioned to transfer said soil to containers being conveyed by said lower conveyor means, means for pressing down a part of said lower lap as it passes above the containers on said lower conveyor means to flatten and compress the soil in said containers, a reciprocating packing plate at the output end of said lower conveyor for packing the soil in said containers by vertical reciprocation, and projections attached to the bottom of said packing plate to dig openings in the soil in said containers to permit the introduction of a cultivatable organism therein.

2. Apparatus as claimed in claim 1, in which the upper and lower conveyor means are driven by a power source to travel at the same speed, with said lower conveyor means and the lower lap of said upper conveyor means travelling in the same direction.

3. Apparatus as claimed in claim 1, in which said soil supplying means comprises a bottomless hopper having an adjustable gate adapted to regulate the rate of discharge of the soil.

4. Apparatus as claimed in claim 1, in which said flattening means comprises a tension roller connected with a spring provided within the loop formed by the continuous upper conveyor belt in order to press down the lower lap of the upper conveyor belt.

5. Apparatus as claimed in claim 1, in which the lower conveyor means is equipped with a cradle for holding a plurality of containers in rows, which cradle is transferred to a position beneath said packing plate.

6. Apparatus as claimed in claim 5 which comprises a clutch through which said packing plate is driven and means for engaging said clutch when said cradle is beneath said packing plate.

* * * * *